(12) United States Patent  
Marshall et al.

(10) Patent No.: US 9,400,178 B2
(45) Date of Patent: Jul. 26, 2016

(54) METHOD FOR OPTIMISING A MEASUREMENT CYCLE

(75) Inventors: Derek Marshall, Bristol (GB); David J. Rogers, Dursley (GB); Jean-Marc Giacalone, Bristol (GB)

(73) Assignee: RENISHAW PLC, Wotton-Under-Edge (GB)

(*) Notice: Subject to any disclaimer, the term of this patent is extended or adjusted under 35 U.S.C. 154(b) by 328 days.

(21) Appl. No.: 13/142,543

(22) PCT Filed: Jan. 12, 2010

(86) PCT No.: PCT/GB2010/000038
§ 371 (c)(1),
(2), (4) Date: Jun. 28, 2011

(87) PCT Pub. No.: WO2010/084302
PCT Pub. Date: Jul. 29, 2010

(65) Prior Publication Data
US 2011/0276303 A1    Nov. 10, 2011

(30) Foreign Application Priority Data

Jan. 20, 2009 (GB) .................................. 0900878.0

(51) Int. Cl.
*G01B 21/04* (2006.01)
(52) U.S. Cl.
CPC .... *G01B 21/047* (2013.01); *G05B 2219/37193* (2013.01)
(58) Field of Classification Search
CPC ............................. G06F 15/00; G01B 21/047
USPC ....................................................... 702/141
See application file for complete search history.

(56) References Cited

U.S. PATENT DOCUMENTS

| 4,153,998 A | 5/1979 | McMurtry |
| 4,484,118 A | 11/1984 | Manabe et al. |
| 5,521,350 A | 5/1996 | Nishi et al. |
| 5,583,443 A | 12/1996 | McMurtry et al. |
| 6,052,628 A * | 4/2000 | Hong ............................ 700/195 |
| 6,131,301 A | 10/2000 | Sutherland |

(Continued)

FOREIGN PATENT DOCUMENTS

| CN | 1961195 A | 5/2007 |
| CN | 1993600 A | 7/2007 |

(Continued)

OTHER PUBLICATIONS

British Search Report for priority British Patent Application No. 0900878.0, dated Apr. 20, 2009.

(Continued)

*Primary Examiner* — Andrew Schechter
*Assistant Examiner* — Daniel Kessie
(74) *Attorney, Agent, or Firm* — Oliff PLC

(57) ABSTRACT

A method is described for calculating an optimum stand-off distance for surface position measurements to be acquired by a coordinate positioning apparatus including a measurement probe. The coordinate positioning apparatus may include a machine tool and the measurement probe may include a touch trigger probe having a deflectable stylus. The method includes the step of calculating an optimum stand-off distance using at least one measured acceleration characteristic of the coordinate positioning apparatus. In this manner, measurement cycle times may be optimised.

18 Claims, 6 Drawing Sheets

(56) References Cited

U.S. PATENT DOCUMENTS

Figure 1:
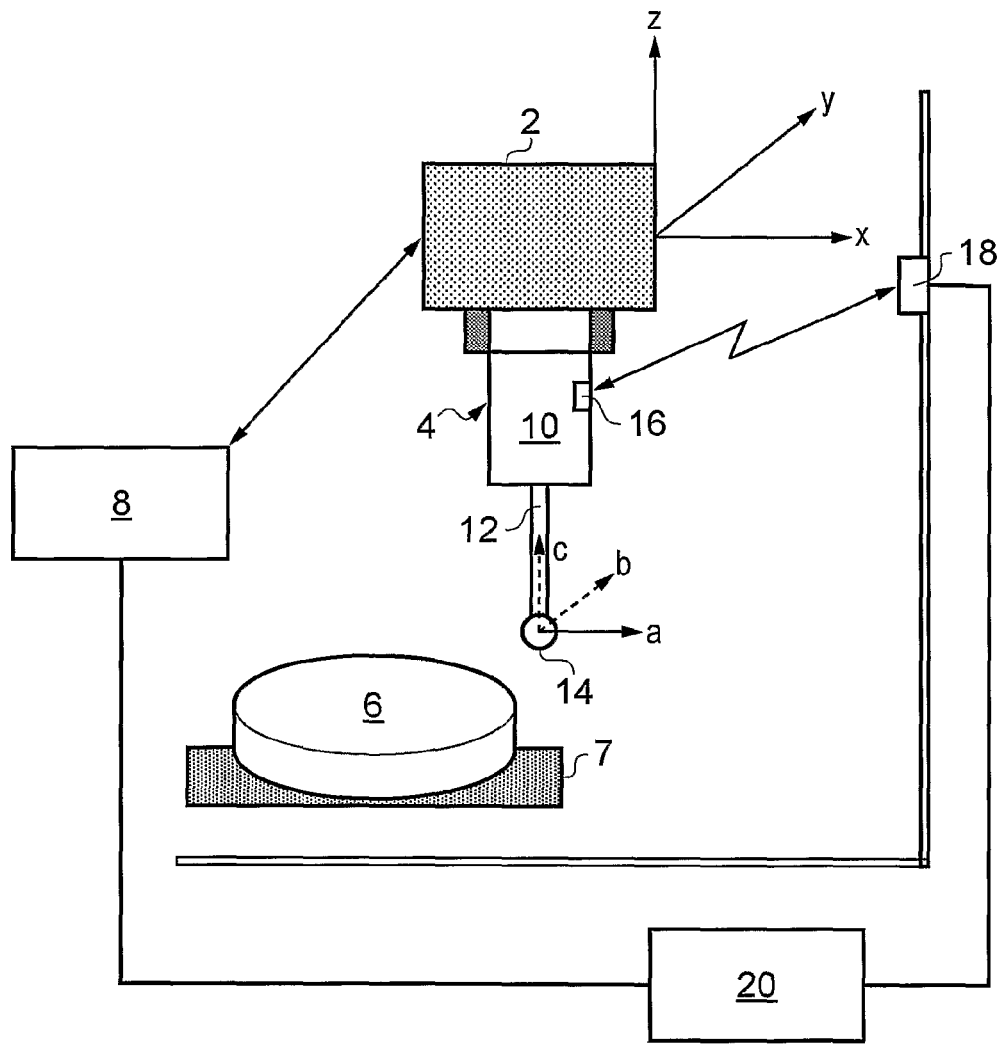

| | | | |
|---|---|---|---|
| 6,308,108 B1 | 10/2001 | Michiwaki et al. | |
| 6,665,239 B1 * | 12/2003 | Takahashi et al. | 369/44.23 |
| 7,281,336 B2 * | 10/2007 | Lummes et al. | 33/503 |
| 7,685,726 B2 * | 3/2010 | Fuchs et al. | 33/503 |
| 2005/0171733 A1 | 8/2005 | Hough | |
| 2006/0007184 A1 | 1/2006 | Rosenberg et al. | |
| 2007/0245584 A1 * | 10/2007 | Hagl et al. | 33/561 |
| 2008/0028626 A1 | 2/2008 | Jonas et al. | |
| 2008/0189969 A1 | 8/2008 | Fuchs et al. | |

FOREIGN PATENT DOCUMENTS

| | | |
|---|---|---|
| CN | 101166950 A | 4/2008 |
| EP | 0 073 495 A2 | 3/1983 |
| JP | A-58-037505 | 3/1983 |
| JP | U-58-99606 | 7/1983 |
| JP | A-59-170713 | 9/1984 |
| JP | A-08-075442 | 3/1996 |
| JP | A-2008-500520 | 1/2008 |
| JP | A-2009-501321 | 1/2009 |
| RU | 48164 U1 | 9/2005 |
| WO | WO 2006/013387 A2 | 2/2006 |
| WO | WO 2006/115923 A2 | 11/2006 |

OTHER PUBLICATIONS

Written Opinion for International Patent Application No. PCT/GB2010/000038, mailed on Jul. 26, 2010.
International Search Report for International Patent Application No. PCT/GB2010/000038, mailed on Jul. 26, 2010.
Chinese Office Action issued in Application No. 201080004977.0; Dated Dec. 20, 2012 (With Translation).
Jul. 30, 2013 Official Notice of Rejection issued in Japanese Patent Application No. 2011-546934 (with translation).
Chinese Office Action issued in Chinese Patent Applciation No. 201080004977.0 dated May 20, 2014 (w/ translation).
Nov. 11, 2013 Office Action issued in Chinese Patent Application No. 201080004977.0 (with English Translation).
Jan. 22, 2014 Office Action issued in Russian Patent Application No. 2011134612/28(051317) (with translation).
Nov. 18, 2014 Office Action issued in Russian Application No. 2011134612/28(051317).
Jan. 15, 2015 Office Action issued in Chinese Application No. 201080004977.0.
Jun. 27, 2014 Office Action issued in Russian Application No. 2011134612 (with translation).
Mar. 18, 2016 Notification of Reexamination in Chinese Patent Application No. 201080004977.0.

* cited by examiner

METHOD FOR OPTIMISING A MEASUREMENT CYCLE

The present invention relates to a method for configuring measurement cycles implemented by coordinate positioning apparatus, and in particular to a method for determining an optimum stand-off distance for surface position measurements that are to be acquired by coordinate positioning apparatus that comprises a measurement probe.

Coordinate positioning apparatus, such as machine tools or coordinate measuring machines (CMMs), are known. A variety of measurement probes for use with such coordinate positioning apparatus are also known. For example, touch trigger measurement probes of the type described in U.S. Pat. No. 4,153,998 comprise a kinematic mechanism in which a stylus holder becomes unseated from an associated seat in the probe body when the stylus contacts an object. Unseating of the kinematic mechanism also breaks an electrical circuit thereby generating a trigger signal. Touch trigger probes are also known in which stylus deflection is measured using strain gauges or the like and a trigger signal is issued when a certain stylus deflection threshold is exceeded. The trigger signal issued by a touch trigger probe indicates that contact has been made with an object and is used in combination with machine measurements of the probe position taken by the coordinate positioning apparatus to determine the position of the contacted point on the surface of the object.

A variety of strategies or cycles are known for acquiring measurements using a touch trigger probe carried by coordinate positioning apparatus. These include so-called one-touch measurement cycles in which the stylus of the measurement probe is driven in to the object being measured and the position of a point on the surface of the object is found from the position of the measurement probe, as measured by the apparatus, at the instant the trigger signal is issued. Two-touch measurement cycles are also known in which a measurement at a relatively low speed is preceded by an initial measurement of the same point on the object's surface at a higher speed to establish an approximate position of that point.

Measurement cycles of the type described above require various measurement parameters, such as the speed of probe movement and the stand-off distance from the object that is required before the probe takes a measurement, to be preset. These parameters affect both the measurement cycle time and the accuracy of measurements and are typically set during machine commissioning to standard values that either ensure measurement accuracy is protected or give the required measurement cycle times. As there is a wide variation in the characteristics of coordinate position apparatus, even between identical models of machine produced by the same manufacturer, it has been found that the standard measurement parameters that are typically set during machine commissioning can lead to sub-optimum performance.

According to a first aspect of the invention, a method is provided for calculating an optimum stand-off distance for surface position measurements to be acquired by a coordinate positioning apparatus comprising a measurement probe, wherein the method comprises the step of calculating an optimum stand-off distance using at least one measured acceleration characteristic of the coordinate positioning apparatus.

The present invention thus provides a method for calculating an optimum stand-off distance for measurements that are to be taken using a measurement probe mounted to a coordinate positioning apparatus. As explained in more detail below, and as would be known to a person skilled in the art, the stand-off distance is the initial distance or clearance of the measurement probe (e.g. the stylus tip of a contact type measurement probe) from a point on the surface of an object before the position of that point is measured. In other words, relative movement of the measurement probe towards a point on an object is initiated (e.g. from a stationary start) with a certain stand-off distance between the measurement probe and the point on the object. The optimum stand-off distance calculated by the method of the present invention is the stand-off distance that provides the shortest measurement time for a given level of measurement accuracy.

The method of the present invention calculates the optimum stand-off distance using at least one measured acceleration characteristic of the coordinate positioning apparatus. In particular, it has been found that different coordinate positioning apparatus, even the same model of machine from the same manufacturer, can have markedly different acceleration characteristics. As described above, the use of standardised stand-off distances by installation engineers that are suitable for all potential machine types has led to the widespread use of stand-off distances that are typically significantly longer than is necessary to ensure the necessary measurement accuracy. The method of the present invention allows an optimum stand-off position to be calculated using a measurement or measurements of the acceleration characteristics of the coordinate positioning apparatus thereby allowing measurement times to be reduced without degrading metrology accuracy below the required level.

The at least one acceleration characteristic of the coordinate positioning apparatus may have been previously measured. For example, a manufacturer may measure one or more acceleration characteristics during machine development, construction and/or calibration. Advantageously, the method comprises the step of measuring at least one acceleration characteristic of the coordinate positioning apparatus.

An acceleration characteristic of the coordinate positioning apparatus may be measured in a number of ways. Advantageously, the step of measuring at least one acceleration characteristic of the coordinate positioning apparatus comprises the step of measuring a first time interval corresponding to the time taken for a moveable portion of the coordinate positioning apparatus to move between two points of known separation at a commanded speed. The moveable portion of the coordinate positioning apparatus may, for example, comprise the part of the coordinate positioning apparatus to which the measurement probe is mounted for movement relative to the object to be measured. The two points of known separation may comprise a start point and an end point. The method may thus include the moveable portion being accelerated from a standstill (or a certain speed) at the start point and/or the moveable portion being decelerated to a stop (or a certain speed) at the end point. It can then be seen that the commanded speed is not reached immediately due to the necessary acceleration and/or deceleration of the moveable portion. Any suitable clock may be used to measure the first time interval. For example, a clock of the coordinate positioning apparatus may be used to time the duration of the first time interval.

Advantageously, the method also comprises the step of comparing the first time interval to a second (e.g. theoretical or measured) time interval that corresponds to the time that would be taken to move between the two points of known separation at a constant speed that is equal to the commanded speed. In other words, a time to travel between the two points at constant speed is compared to the time taken when also accelerating and/or decelerating to that constant speed. The actual time taken to travel between the two points (i.e. the first time interval) will be longer than the second time interval due to the acceleration and/or deceleration of the moveable portion. This difference between first and second time intervals provides a measure of a coordinate positioning apparatus acceleration characteristic. In other words, an acceleration zone of the coordinate positioning apparatus can be found by timing an actual move between two points in space and comparing that time to the time that would be taken for a move between those points without any acceleration.

As an alternative to the above, an acceleration characteristic may also be found by comparing the first time interval taken using a first commanded speed to a second time interval measured for a similar move using a second (different) commanded speed. The differences in acceleration between the two or more different speed moves provides a measure of the acceleration characteristic. In other words, the time taken to complete a move may be measured at two or more different speeds or feedrates to establish at least one acceleration characteristic.

It should be noted that the measurement probe may, or may not, be mounted to the moveable portion of the coordinate positioning apparatus whilst time intervals are measured. Furthermore, the measurement of the acceleration characteristic(s) of the coordinate positioning apparatus may immediately precede the step of calculating the optimum stand-off distance or may be performed during machine development, build or calibration. It should also be noted that the term acceleration characteristic as used herein encompasses both acceleration and deceleration effects. A plurality of acceleration characteristics may be measured for a coordinate positioning apparatus. For example, an acceleration zone may be measured separately for each machine axis.

The optimum stand-off distance calculated using the method of the present invention may depend on the required accuracy of the measurements. For example, it may be acceptable to have a small amount of machine acceleration present during a subsequent surface position measurement if lower accuracy surface position measurements are required. It is, however, preferred that the optimum stand-off distance is calculated so that the relative speed between the measurement probe and object being measured is substantially constant during the acquisition of surface position measurements. The relative motion between the measurement probe and the object being probed may be provided by movement of the measurement probe and/or movement of the object. Preferably, the measurement probe is carried by a moveable portion (e.g. the quill or spindle) of the coordinate positioning apparatus and moved into contact with a stationary object. The step of calculating an optimum stand-off distance thus advantageously comprises the step of calculating an optimum stand-off distance that ensures the measurement probe will be moving at a substantially constant speed during the subsequent acquisition of surface position measurements.

In addition to the at least one acceleration characteristic, the step of calculating an optimum stand-off distance may take into account other factors or components. For example, the optimum stand-off distance may be formed by the addition of an acceleration characteristic distance component and further distance components. Conveniently, the step of calculating the optimum stand-off distance comprises taking account of any uncertainty in the estimated or nominal positions of the points for which surface position measurements are to be acquired. In other words, if the nominal position of the surface to be probed is known to within a certain tolerance, a tolerance distance component may be included in the optimum stand-off distance that takes account of this uncertainty. This tolerance component helps ensure that measurements are taken at constant speed for any surfaces within the defined tolerance range.

For certain coordinate positioning apparatus, the time taken to accelerate or decelerate from a standstill to a given speed is constant. For other apparatus, acceleration occurs at a constant rate. The optimum stand-off distance is therefore preferably calculated for a given speed or feed rate that will be used in subsequent surface position measurements. Advantageously, the method comprises the step of calculating an optimum stand-off distance for each of a plurality of measurement speeds. For example, the method may comprise the step of calculating a first optimum stand-off distance at a first feed rate and a further step of calculating at least one further optimum stand-off distance for at least one further feed rate.

As outlined above, an optimum stand-off distance may be calculated separately for each feed rate that is to be used for surface position measurements. Alternatively, an optimum stand-off distance may be calculated for at least two feed rates and used (e.g. by an extrapolation technique) to establish optimum stand-off distances at other speeds. Advantageously, the method may comprise the step of deriving a function or relationship from the optimum stand-off distances calculated at the plurality of measurement speeds or feed rates that allows an optimum stand-off distance to be estimated over a range of measurement speeds.

The method may be used with any type of measurement probe; e.g. the measurement probe may be a contact or non-contact probe as required. Advantageously, the measurement probe of the coordinate positioning apparatus comprises a touch trigger probe having a deflectable, workpiece contacting, stylus.

A typical touch trigger probe having a deflectable stylus will have an overtravel limit. The overtravel limit is the maximum deflection of the stylus that can occur before some part of the measurement probe mechanism or stylus suffers mechanical damage. The overtravel limit may include a safety margin and is typically defined by the probe manufacturer. Advantageously, the method also comprises the step of calculating the maximum measurement speed or feed rate that can be used for surface position measurements without exceeding the probe's overtravel limit. In other words, the various delays between the stylus making contact with a surface and the coordinate positioning apparatus bringing the measurement probe to a complete halt may be determined and used to establish the maximum feed rate that can be used to ensure the overtravel limit of the touch trigger probe is not breached.

The optimum stand-off distance calculated using the present method may be stored in the coordinate measurement apparatus for subsequent use in the acquisition of surface position measurements. After calculation of the optimum stand-off distance, the method conveniently includes the additional step of taking one or more surface position measurements of an object using the optimum stand-off distance. In other words, the measurement probe may be moved towards the surface to be measured from an initial point in space that is spaced apart from the surface by the optimum stand-off distance.

As outlined in more detail below, the process of acquiring a surface position measurement may be implemented using a one-touch or a two-touch probing strategy or measurement cycle. For a two-touch measurement cycle, a first touch is used to provide an estimated or rough surface position and the second touch acquires the surface position measurements using the optimum stand-off distance. In such a two-touch measurement cycle, each surface position measurement is preferably preceded by an initial measurement of substantially the same point on the surface of the object. Conveniently, the surface position measurements (i.e. the second touches) are conducted at a first measurement speed and the initial measurements (i.e. the first touches) are conducted at a second measurement speed. Preferably, the second measurement speed is higher than the first measurement speed. In this manner, a high speed first touch move is used to quickly find the rough position of a point on the surface of an object. The measurement probe is then moved to the optimum stand-off distance and a second touch move is conducted (e.g. at a lower speed) to accurately measure the position of the point on the surface.

In a two-touch measurement cycle, it should be noted that the first touch measurement (which is typically taken at high speed) may include a substantial error or uncertainty in the surface measurement. This may include an error arising from any uncertainty in the numeric controller response time and is thus especially significant for slower scan time controllers. For coordinate positioning apparatus including a numeric controller, the step of calculating the optimum stand-off distance preferably comprises taking account of any uncertainty in the response time of the numeric controller. In particular, the optimum stand-off distance preferably takes into account the effect that the uncertainty in the controller response time has on the estimated surface positions found during the first touch of the measurement cycle. For example, the optimum stand-off distance may include a distance component that accounts for the error in the estimated position of the point to be measured on the surface arising from the controller response time uncertainty.

Preferably, the coordinate positioning apparatus comprises a numeric controller and the method comprises the step of assessing the uncertainty in the response time of the numeric controller. This uncertainty may be used to calculate the distance component mentioned above for a two-touch strategy. Advantageously, the uncertainty in the response time of the numeric controller that is found in such a manner may be used to select the appropriate probing strategy (e.g. a one-touch or two-touch strategy) to be used for taking surface position measurements of an object.

The method of the present invention may be implemented on any coordinate positioning apparatus, such as a machine tool or dedicated coordinate measuring machine (CMM). Advantageously, the method is conducted on a coordinate positioning apparatus that comprises a numerically controlled machine tool having a spindle in which a measurement probe can be releasably retained.

The present invention also extends to a computer program that, when run on a computer (e.g. a general purpose computer or a numeric controller), implements the method described above. A computer (e.g. a general purpose computer or a numeric controller) programmed to implement the method may also be provided in accordance with the present invention. A computer storage carrier (e.g. a compact disk) for storing such a program may also be provided.

According to a second aspect of the invention, a coordinate positioning apparatus comprises a measurement probe for acquiring surface position measurements, wherein the coordinate positioning apparatus comprises a processor for calculating an optimum stand-off distance for surface position measurements to be acquired by the coordinate position apparatus, the processor calculating the optimum stand-off distance using at least one measured acceleration characteristic of the coordinate positioning apparatus.

According to a third aspect of the invention, a method is provided for calculating a maximum speed for protected positioning moves on a coordinate positioning apparatus comprising a measurement probe, wherein the method comprises the step of calculating the maximum speed using at least one measured acceleration characteristic of the coordinate positioning apparatus. As would be understood by a person skilled in the art, a protected positioning move is a positioning move that is undertaken when the coordinate positioning apparatus moves a measurement probe whilst monitoring the trigger or signal line of that probe. A protected positioning move may thus include a move that is performed as part of a measurement cycle or a move conducted before or after a measurement in order to move the probe into a desired position. Advantageously, the coordinate positioning apparatus comprising a measurement probe having an overtravel limit. In such an example, the maximum speed for a protected positioning move is the highest speed that can be used that ensures the overtravel limit is not exceeded if an object is contacted and movement of the probe halted.

A coordinate positioning apparatus may also be provided that comprises a measurement probe for acquiring surface position measurements, wherein the coordinate positioning apparatus comprises a processor for calculating a maximum speed for protected positioning moves using the measurement probe, wherein the processor calculates the maximum speed using at least one measured acceleration characteristic of the coordinate positioning apparatus.

According to a fourth aspect of the invention, a method is provided for selecting a measurement strategy for co-ordinate positioning apparatus comprising a numeric controller, wherein the method comprises the step of determining the uncertainty in the response time of the numeric controller. In other words, a measure of the uncertainty in the time taken by the numeric controller to respond to a trigger signal received from a measurement probe may be established. As outlined below in more detail, this may be achieved by taking a plurality of measurements of the same point on an object's surface using different stand-offs and/or measurements speeds. The uncertainty of such a series of measurements provides a measure of the uncertainty of the response time of the numeric controller.

The uncertainty in the response time of the numeric controller that is found in such a manner may be used to select the appropriate probing strategy to be used for taking surface position measurements of an object. For example, if the numeric controller is found to operate at a high speed (i.e. has a low response time uncertainty) a so-called one-touch probing strategy may be implemented. If the numeric controller is found to be low speed (i.e. has a high response time uncertainty) a so-called two-touch probing strategy may be implemented in which each surface position measurement is preceded by an initial measurement of substantially the same point on the surface of the object. In such a two-touch strategy, the surface position measurements are preferably conducted at a first measurement speed and the initial measurements are conducted at a second measurement speed, the second measurement speed being higher than the first measurement speed.

According to a further aspect of the invention, a method is provided for optimising surface position measurements acquired by a coordinate positioning apparatus comprising a measurement probe, wherein the method comprises the step of measuring at least one acceleration characteristic of the coordinate positioning apparatus.

Figure 2:
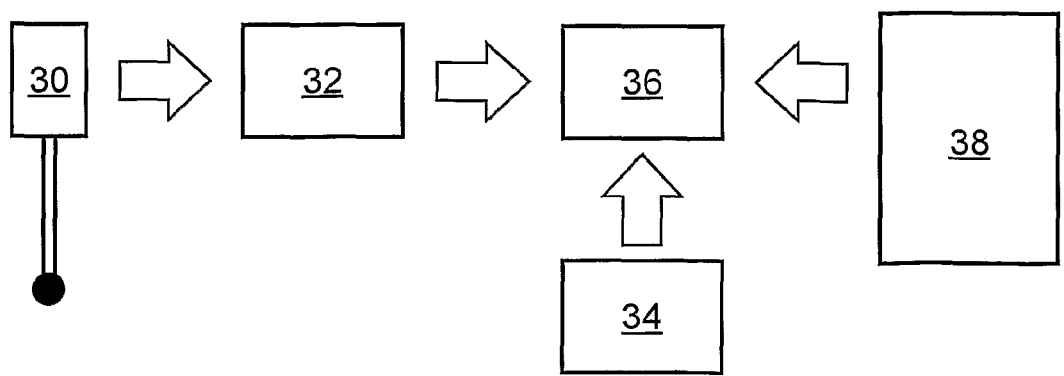
Figure 3:
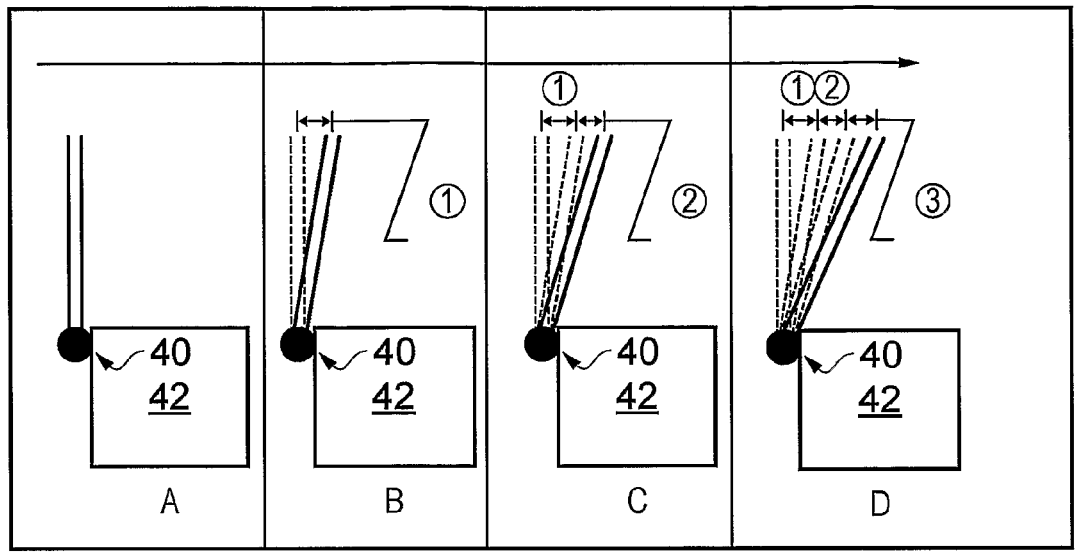
Figure 4:
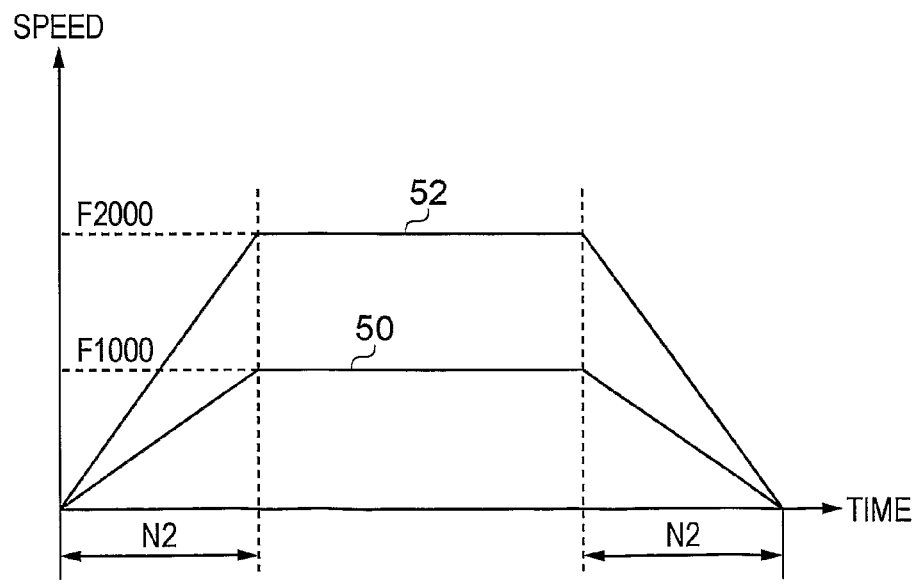
Figure 5:
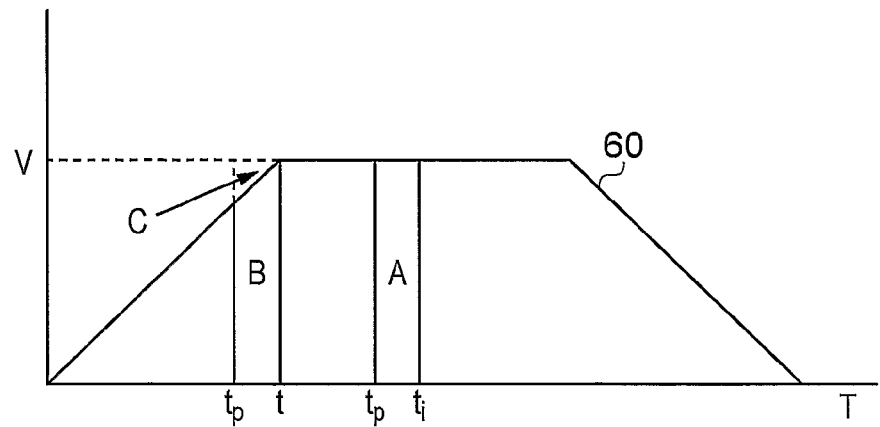
Figure 6:
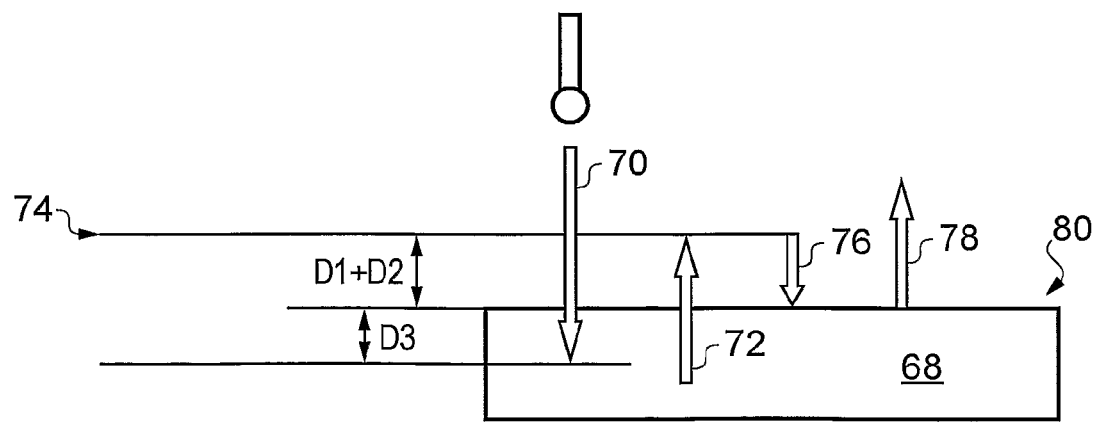
Figure 7A:
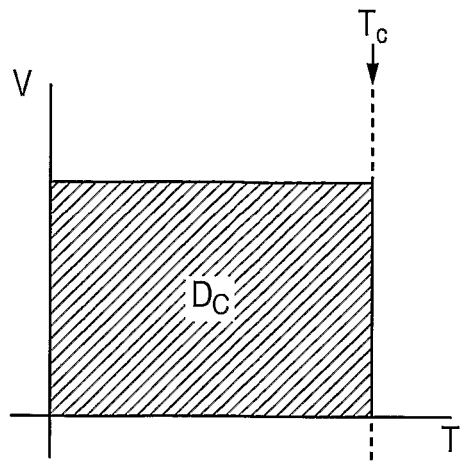
Figure 7B:
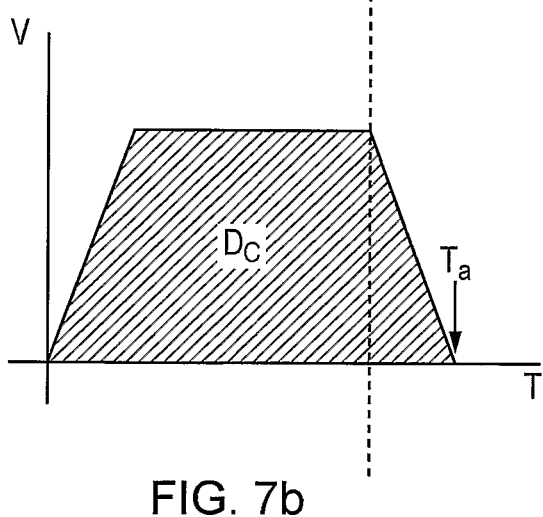
Figure 8:
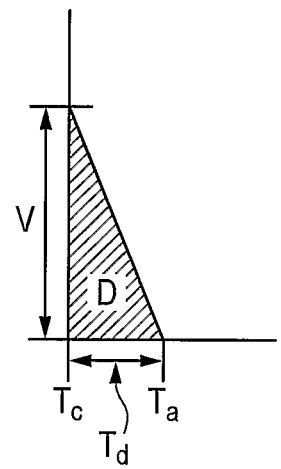
Figure 9:
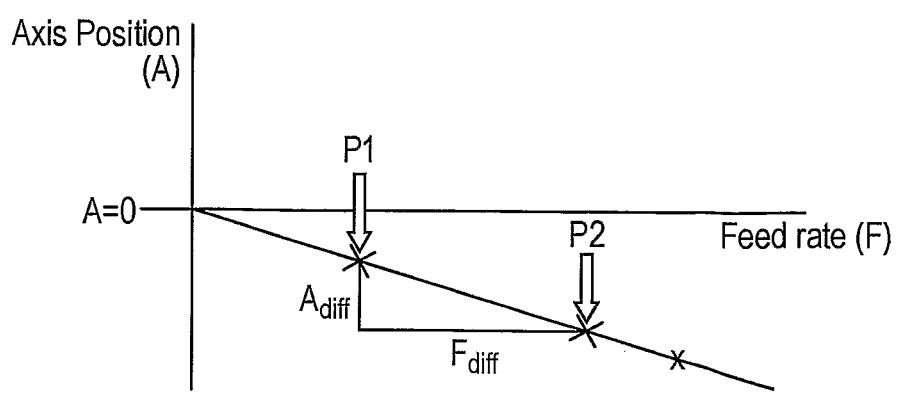
Figure 10:
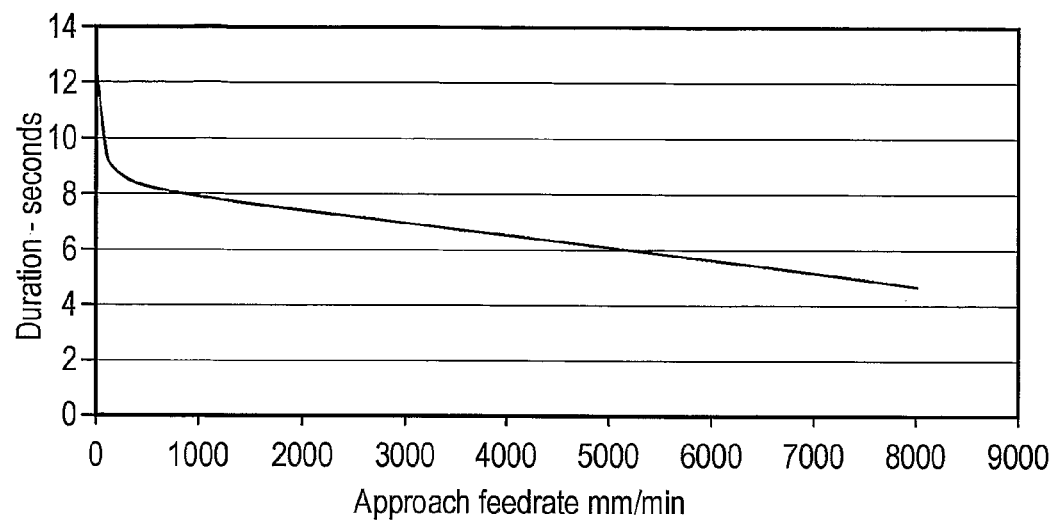
Figure 11:
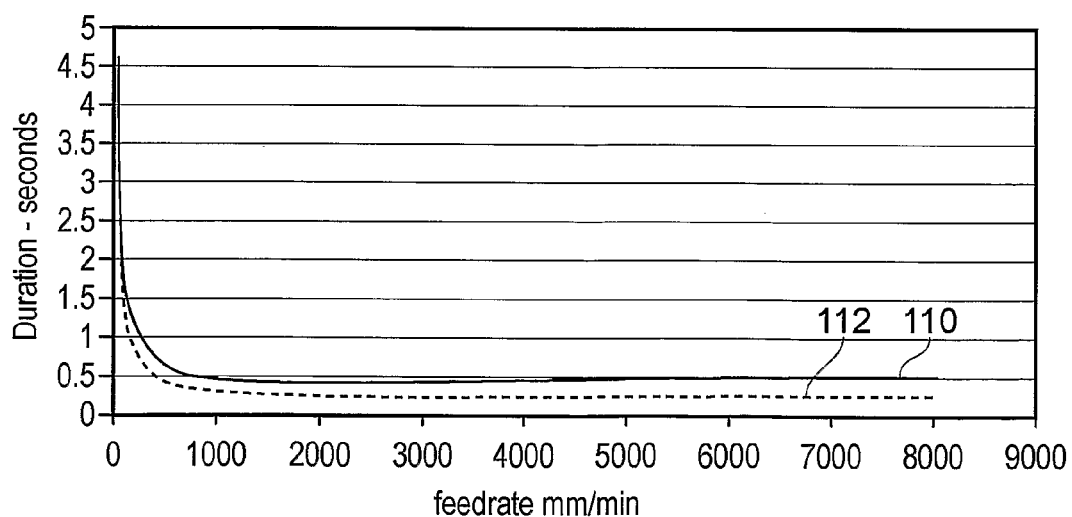
Figure 12:
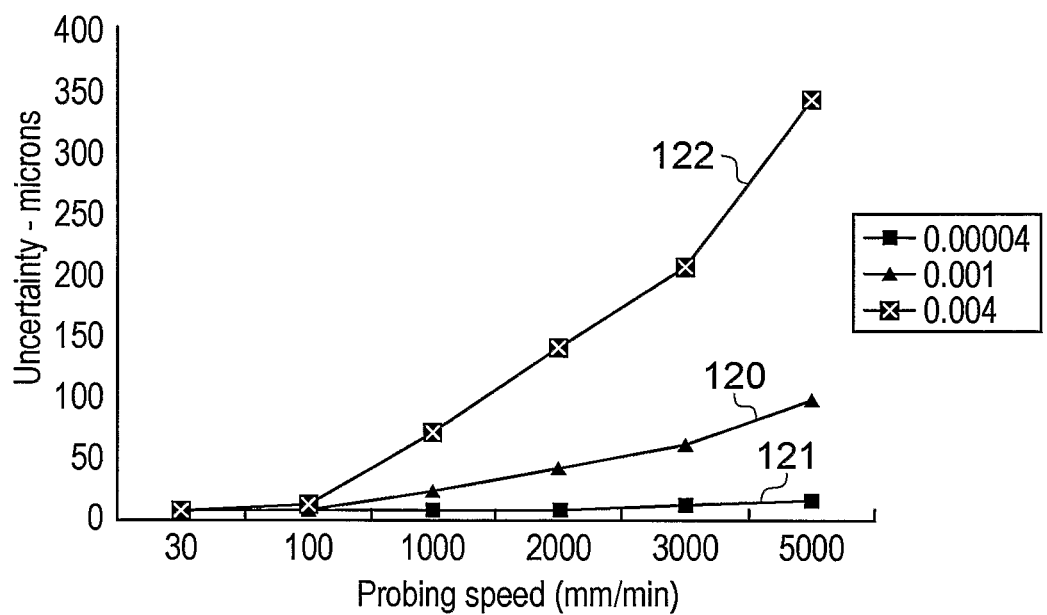
Figure 13:
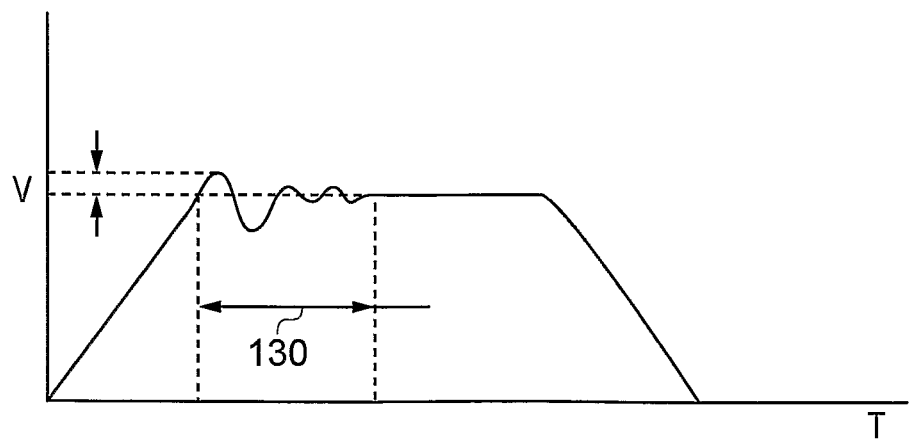

The invention will now be described, by way of example only, with reference to the accompanying drawings in which;

FIG. 1 is an illustration of coordinate positioning apparatus carrying a measurement probe having a deflectable stylus, FIG. 2 illustrates the typical architecture of a machine tool probing system, FIG. 3 illustrates the different factors that contribute to probe overtravel, FIG. 4 shows the acceleration zones that exist on one type of machine tool, FIG. 5 shows how measurement acquired during periods of machine acceleration produce measurement errors, FIG. 6 illustrates a two-touch probing routine, FIGS. 7a and 7b illustrate how an acceleration zone of a machine can be measured to establish an acceleration distance, FIG. 8 shows the acceleration zones of the machine of FIGS. 7a and 7b, FIG. 9 illustrates the concept of dynamic error, FIG. 10 shows the speed of a measurement cycle using a non-optimised two-touch probing strategy, FIG. 11 compares the measurement speed of an optimised two-touch probing strategy of the present invention with a one-touch strategy, FIG. 12 shows the increase in error as a function of feed rate for a one-touch probing strategy, and FIG. 13 shows the effect of velocity settling when using high feed rates.

Referring to FIG. 1, a machine tool is illustrated having a spindle 2 holding a touch trigger probe 4.

The machine tool comprises known means, such as one or more motors 8, for moving the spindle 2 relative to a workpiece 6 located on a workpiece holder 7 within the work area of the machine tool. The location of the spindle within the work area of the machine is accurately measured in a known manner using encoders or the like; such measurements provide spindle position data defined in the machine coordinate system (x,y,z). A numerical controller (NC) 20 controls (x,y,z) controls movement of the spindle 2 within the work area of the machine tool and also receives information from the various encoders about spindle position. The NC 20 may comprise a front-end computer or be interfaced to such a computer.

The touch trigger probe 4 comprises a probe body 10 that is attached to the spindle 2 of the machine tool using a standard releasable shank connector. The probe 4 also comprises a workpiece contacting stylus 12 that protrudes from the housing. A stylus ball 14 is provided at the distal end of the stylus 12 for contacting the associated workpiece 6. The touch trigger probe 4 generates a so-called trigger signal when deflection of the stylus exceeds a predetermined threshold. The probe 4 comprises a wireless transmitter/receiver portion 16 for passing the trigger signal to a corresponding wireless receiver/transmitter portion of a remote probe interface 18. The wireless link may be, for example, RF or optical.

The NC 20 receives the spindle position (x,y,z) data and the trigger signal (via the probe interface 18) and records the apparent spindle position data (x,y,z) at the instant the trigger signal is received. After appropriate calibration, this allows the position of points on the surface of objects, such as the workpiece 6, to be measured.

As schematically illustrated in FIG. 2, a probing system fitted to a machine tool can be considered to consist of five elements. These include the measurement probe assembly 30, the probe interface 32 (which including the probe transmission system and its interface to the CNC system 36), the machine tool 34, the CNC control system 36 and the probe control software 38 that resides on the CNC control system 36. Each of these elements plays a part in the metrology performance of the probing system and the duration of any given measurement or probing cycle.

The key event within any measuring cycle implemented using the above described probing system is the trigger. Contact of the stylus of the measurement probe 30 with a point on the surface of an object precipitates a change within the probe interface 32 that is passed to the CNC controller 36. This process, which is described in more detail below with reference to FIG. 3, may appear to an operator to happen instantaneously. In reality, however, it involves a series of discrete steps that culminate in a trigger signal being acted upon by the CNC controller 36.

Referring to FIG. 3, the various phases of a typical touch trigger probing sequence are illustrated.

During the measurement process, the probe is driven towards the surface of the object 42 to be measured. At a first instant of time A, the stylus tip 40 makes contact with a point on the surface of the object. During this first phase of the measurement process, the probe continues to move towards the object and the stylus is further deflected. At a second instant of time B, the stylus deflection threshold of the measurement probe is exceeded. The distance required to be travelled by the probe between the initial contact with a surface and the probe sensing threshold being reached is called the mechanical pre-travel. In known types of kinematic probe, the mechanical pre-travel is the distance required to bend the stylus sufficiently to store enough strain energy to begin lifting a roller from its seat overcoming the force of the return spring. In a so-called strain gauge probe, the stylus bends until the strain gauge arrangement registers a change in strain that exceeds a preset value. Mechanical pre-travel is probe hardware dependent and does not vary with the speed of probe movement during the measurement cycle. It is thus typically possible to "calibrate out" mechanical pre-travel effects with appropriate calibration and application software.

The second phase of the measurement process, which begins after the mechanical pre-travel or first phase, involves the probe interface recognising that a mechanical trigger event has occurred and issuing a trigger signal to the CNC controller. The delay between the mechanical trigger event and the trigger signal being transmitted to the CNC controller is typically called the interface response time. In other words, the interface issues its trigger signal at the time instant C shown in FIG. 3 at which point the probe has travelled yet further towards the object thereby further deflecting the stylus.

It should be noted that the interface response time typically includes a delay associated with signal filtering. This signal filtering delay arises because a typical probe interface continuously monitors the status of the associated measurement probe and transmits a trigger signal to the CNC system when the measurement probe makes contact with a surface. There are, however, forces acting on the stylus (e.g. inertia) which could be incorrectly interpreted by the interface as a surface contact event. For example, if long styli are used with high probe accelerations it is quite possible to get transient stylus deflections that could lead to so-called "false triggering" (i.e. triggering when the stylus has not actually made contact with a surface). In order to improve the reliability of the trigger signal, probe interfaces are typically arranged to filter out any transient signals and will only transmit a trigger signal to the controller if the deflection threshold signal level is exceeded for a predetermined length of time (e.g. 0.01 secs). There can also be a small delay component of the interface response time associated with transmitting the trigger event from the probe to the interface; for example, 0.002 seconds in the case of a typical optical transmission system or 0.01 seconds in the case of a standard RF communication system. Although the probe interface response time can vary considerably between measurement systems, it is usually constant for a particular set-ups and can therefore typically be calibrated out.

The third phase of a typical probe trigger sequence is the process by which the CNC controller of the machine recognises and acts on a trigger signal received from the probe interface. The CNC controller thus acts on the received trigger signal (e.g. by halting probe movement) at the time instant D shown in FIG. 3, at which point the probe has travelled even further thereby increasing the deflection of the stylus. This time delay introduced by the CNC controller is often called the controller response time.

Although it is possible to compensate for substantially constant delays (e.g. mechanical pre-travel effects and the probe interface response time) by an appropriate calibration procedure, there is often a high level of uncertainty associated with the controller response time. Furthermore, different makes and types of CNC controller can have controller response times that vary by several orders of magnitude. For example, the time delay between the issuance of a trigger signal and the CNC controller being able to take action in response to that signal could be as short as 4 μs, or as long as 4 ms, dependent on the controller specification and the purchased controller options.

At the slow end, certain commercially available CNC controllers have scanned inputs. Such CNC controllers typically have a scan time during which they check, in turn, the status of various input lines and also set the status of various output lines. Consequently, the trigger signal input line will be scanned and the status acted upon once every cycle but this will occur at an indeterminate point in time between zero and the full scan time. The scan time can thus be considered a jitter. A typical scan time or jitter for such a slow controller is around 1-4 ms. At the fast end of the spectrum, NC controllers are available with so-called direct or high speed skip interrupts or inputs for receiving a trigger signal. In such controllers, the probe trigger signal may be connected directly to each axis control board and the current axis position latched or recorded almost instantaneously upon receipt of the trigger signal. This type of probe signal integration with the axis control boards typically provides a response time or latency in the order of 4 μs, with negligible jitter As the controller scan time increases, the error associated with a measurement taken using a measurement probe driven towards an object at a certain speed or feed rate will also increase. On a machine with a direct or high speed input having an associated time delay of 4 μs, the effect of the controller response time can be ignored even at extremely high feed rates because the distance travelled by the machine during this time is negligible. However, it has been found that metrology accuracy can be significantly degraded when taking measurements at higher feed rates on machines that have longer scan times. As outlined in more detail below, the present invention can provide an optimised two-touch measuring cycle that still provides high metrology performance even if the controller has a long scan time. It may, however, be desirable to select a probing strategy (e.g. a one-touch or two-touch strategy) that is most appropriate for the controller being used.

A one-touch or two-touch strategy may be selected automatically (e.g. as described below) or set by a user based on the known controller scan time. In particular, a two-touch measurement strategy may be used for slow (e.g. millisecond) controllers whereas a one-touch measurement strategy may be employed for high speed (e.g. microsecond) controllers. A user may simply program the CNC controller to implement the required strategy dependent on the known scan speed of the CNC controller. Advantageously, the controller response time may be assessed automatically. This may be performed by analysing the repeatability of a plurality of measurements of the same point on the surface of an object. For example, the same point may be measured at a plurality of different speeds using the same stand-off distance. Alternatively, the same point may be measured at a single speed using a plurality of different stand-off distances. The repeatability of such measurements will be much higher for faster controllers thereby allowing such controllers to be identified. A repeatability or measurement uncertainty threshold may thus be set (e.g. at 10 μm) and a one-touch strategy implemented when the measurement uncertainty is found to be below such a threshold value.

Referring to FIG. 4, it is shown how the spindle of a machine tool that carries the measurement probe takes a certain amount of time to accelerate to, or decelerate from, a constant speed or feed rate. In other words, if a machine tool spindle is commanded by the CNC controller to start moving at a certain feed rate, it will take a certain amount of time to accelerate to that feed rate. This acceleration/deceleration of the spindle is often called the acceleration zone of the machine.

The control algorithms which determine the way in which a machine tool accelerates and decelerates are set by the manufacturer of the CNC control system. These control algorithms can vary between machine builds and may also be altered when a machine is recalibrated. The main CNC control system manufacturers, Siemens, Fanuc, Heidenhein and Mitsubishi all implement their own particular logic schemes and calculations. However, as a general rule, machine tools do not typically accelerate at constant rates. For Fanuc and Mitsubishi controllers, for example, the rate of acceleration is set so that the programmed feed rate is reached in a predetermined time (e.g. 0.06 Seconds). Consequently the distance that is travelled by the machine tool axis to achieve the programmed feed rate increases linearly with feed rate. This is shown in FIG. 4 where the speed as a function of time is shown for a commanded move at a first feed rate of 1000 mm/sec and a second feed rate of 2000 mm/sec; the speed profiles for the first and second feed rates being illustrated by lines 50 and 52 respectively.

Referring to FIG. 5, the detrimental effect of taking measurement in the acceleration zone of a machine will be explained. It is generally understood and accepted that all measurement probe systems require calibration. Typically, this requires the probing of a known surface at the feed rate that will subsequently be used in measurement cycles. As explained above, there is a difference between the position of a point on the surface of an object that is recorded by the CNC control system and the actual position of that point. This difference arises from the mechanical pre-travel of the measurement probe and the delay due to the probe interface response time. The difference can also be thought of as a time delay between the stylus contacting an object and receipt of a trigger signal by the CNC control system. For ease of understanding, the uncertainty in controller response time will be ignored in the following explanation of acceleration effects.

FIG. 5 shows a typical velocity versus time plot 60 for a machine tool. The time delay due to mechanical pre-travel and the probe interface response time that is associated with a measurement will be substantially constant for a given installation.

To remove the effect of the time delay from measurements acquired with the measurement system, the distance A travelled in the time between the stylus contacting an object at time Tp and the time Ti of issuance of a trigger signal by the probe interface is calculated. This distance A, which is valid for a particular feed rate, can then be stored and used to correct all future reported positions taken at that feed rate. Consider now a measurement taken in the acceleration zone of the machine. As the machine is accelerating, the distance B travelled by the measurement probe in the time between the stylus contacting an object at time Tp and the time Ti of issuance of a trigger signal will differ from distance A. In, other words, the correction of measured position will be subject to an error C of a magnitude that depends on the portion of the acceleration zone that is used for the measurement.

It can thus be seen that the acquisition of surface measurements whilst a measurement probe is in the acceleration zone should be avoided. In other words, it should be ensured that the measurement probe is moving at a constant velocity when the stylus makes contact with the object's surface in order to ensure accurate metrology. If the measurement cycle is initiated from a stationary start, the measurement probe should therefore be positioned a sufficient distance from the object surface to allow acceleration of the measurement probe to the required constant speed before any surface measurements are taken; this initial distance from the surface is termed the stand-off distance and a method is described with reference to FIGS. 6 to 9 below for calculating an optimum stand-off distance.

It should also be noted that contact measurement probes having a deflectable stylus will have a so-called over-travel limit. If the stylus of the probe is deflected beyond this over-travel limit, mechanical damage to the probe's deflection sensing mechanism, and/or stylus breakage, may occur. A maximum feed rate for use during measurements can thus be found so that it can be assured that the probe will be halted after contacting a surface before the over-travel limit is reached. Such a maximum feed rate can be calculated by taking into account the various delays in the triggering process (e.g. the mechanical pre-travel, interface and controller response times described with reference to FIG. 3) plus the time required for the probe to decelerate to a halt when instructed by the CNC controller.

Referring now to FIG. 6, a so-called two-touch measurement cycle for measuring the position of a point on the surface of an object 68 is illustrated.

In a first step illustrated by arrow 70, the measurement probe is accelerated from a stationary start position towards the surface of the object 68 at a relatively high feed rate. The stylus of the measurement probe contacts the object's surface and deflection of the stylus continues until the probe trigger is acknowledged by the CNC controller which then halts movement of the measurement probe. This first step is performed to find the surface of the object being measured and is not used to provide an accurate surface position measurement.

In a second step illustrated by arrow 72, the direction of probe movement is reversed and the measurement probe is moved to the stand-off position 74.

In a third step illustrated by arrow 76, the stylus of the measurement probe is again driven into contact with the point on the surface of the object, but at a slower feed rate. Although shown side-by-side in FIG. 6, it should be remembered that the stylus of the measurement probe contacts substantially the same point on the surface of the object in the third step that was contacted in the first step. This second, lower speed, measurement provides the required position measurement of the point on the surface of the object.

In a fourth step 78 illustrated by arrow 78, the measurement probe is moved away from the surface to the start position of the next measurement or to any other required position. The method may, of course, be repeated multiple times to measure a plurality of points on the surface of the object.

The stand-off distance used in the second step dictates the speed and accuracy of the measurements that are acquired in the third step. If the stand-off distance is too small the measurements may be taken whilst the probe is being accelerated to the required speed by the machine tool thereby reducing the accuracy of the metrology. Conversely, if the stand-off distance is too large, the time taken to drive the probe into contact with the surface of the object at the lower feed rate can be significant thereby increasing the time required to complete a measurement cycle and reducing overall productivity. All machine tools have different characteristics and it has been found that, for a typical probing system, the installation engineer or end-user will have a tendency to be overcautious when setting the stand-off distance so as to not affect the metrology. This, however, has been found to have led to two-touch measurement cycles being implemented that are significantly slower than necessary and are thus sub-optimal.

Referring again to FIG. 6, it is shown how an optimum stand-off distance or position 74 can be calculated taking in to account an acceleration distance D1 for the second touch measurement (i.e. for the measurement of the third step of the method performed at the slower feed rate) and a distance D2 to allow for the CNC controller response time uncertainty during the first touch measurement (i.e. the measurement performed in the first step of the method at the higher feed rate). A dynamic zone distance D3, which varies with feed rate, is also shown and accounts for the offset in the measured position of a point on the surface of an object arising from the time delay between the stylus contacting the object's surface and the NC controller acting on the resultant trigger signal; the various phases of a typical touch trigger probing sequence that generate this (substantially constant) delay are described above with reference to FIG. 3. As the second touch measurement is at a relatively low speed, the uncertainty in controller response time for this second measurement is negligible and can be ignored; i.e. the time delay between the stylus contacting the object's surface and the NC controller acting on the resultant trigger signal can be assumed to be substantially constant. The uncertainty in controller response time is, however, taken into account by the distance D2 for the higher feed rate of the first touch.

The optimum stand-off distance is preferably calculated to provide the fastest measurement cycle time in which acceleration effects do not affect the measurements. It should, however, be noted that if lower metrology performance is required it would be possible to set an optimum stand-off distance that reduces acceleration effects to a certain level that provides the required measurement accuracy. In other words, although the various examples described herein describe obtaining measurements with the highest possible levels of accuracy, the method could also be applied to achieve a lower, predetermined, measurement accuracy.

Referring to FIGS. 7a, 7b and 8, a technique for measuring the acceleration distance D1 will be described. In particular, FIG. 7b shows the velocity versus time plot for a test move of the measurement probe in which the integral or area under the curve equals the move distance Dc. As can be seen from FIG. 7b, during the test move the measurement probe is accelerated to a known feed rate and then decelerated to a stop. FIG. 7a shows the velocity versus time plot for a theoretical move of the measurement probe for the same move distance Dc but at a constant velocity.

The acceleration distance D1 is found by timing the actual test move as shown in FIG. 7b and comparing it to the time that such a move would have taken at constant velocity (i.e. without any acceleration or deceleration) as shown in FIG. 7a. A time difference Td between the actual time Ta for the move and the theoretical time Tc that would have been taken to move the same distance Dc at a constant velocity can then be calculated; this is illustrated in FIG. 8.

As shown in FIG. 8, the acceleration/deceleration to the constant speed V occurs over the time period Td. The acceleration distance D1 can thus be calculated via the expression:

$$D_1 = \frac{v \times T_d}{2} \quad (1)$$

It is important to note at this point that the acceleration zone or distance may differ for the various (e.g. x, y, z) axes of the machine tool. For example, the z-axis of the machine tool may have different acceleration characteristics than the x and y axes due to gravity effects. Acceleration zones may thus be calculated separately for each axis and then applied to any measurements taken along the relevant axis or the longest acceleration zone may be applied to all measurements. Alternatively, the acceleration zone may be measured for a single axis that is known or assumed to have the longest acceleration zone.

The distance D2 allows for the uncertainty in CNC controller response time and can be determined, for a given feed rate, from the ladder scan time of the machine tool. In particular, this distance D2 accounts for the uncertainty in the approximate surface position that is determined from the first touch measurement at the higher feed rate. For CNC controllers that have high speed inputs, and/or where a relatively low feed rate is used for the first touch measurement, the distance D2 is negligible and can be ignored.

Referring to FIG. 9, it is shown how the dynamic zone distance D3 varies linearly with feed rate. In particular, FIG. 9 illustrates the measured positions P1 and P2 of a single point on the surface (A=0) of an object when using a first feed rate F1 and a second feed rate F2 respectively. As outlined above, this alteration in apparent position with feed rate arises from the delay between the probe stylus making contact with the point on the surface and the CNC controller acting on that trigger. It can also be seen how the dynamic zone D3 increases linearly with feed rate and approaches zero as the feed rate is reduced to zero. The linear variation of D3 with feed rate can be determined by measuring a point on the surface of an object at two different feed rates. For example, this calculation may be performed using the two surface measurements taken during a two-touch measurement cycle.

Referring now to FIG. 10, the cycle time of a non-optimised two-touch measurement process is illustrated as a function of approach (first touch) feed rate.

In particular, the graph of FIG. 10 illustrates the cycle time of a standard two-touch measurement cycle performed on a surface 2 mm away from an initial start position that is approached at a feed rate of 3000 mm/min. After the first touch, the probe is backed-off by a standardised distance of 4 mm and the point on the surface is measured (i.e. a second touch is performed) using a gauging feed rate of 30 mm/min. This measurement cycle has been found to take 7.05 seconds.

Referring to FIG. 11, a first curve 110 illustrates the cycle time of a two-touch measurement cycle optimised in the manner described above. In particular, by finding an optimised back-off distance that moves the probe sufficiently clear of the surface for the second touch or gauging move reduces the distance of the move at the gauging feed rate of 30 mm/min to small fractions of a millimetre thereby greatly reducing the cycle time. For example, the cycle time of the measurement mentioned above can be reduced from 7.05 seconds to 0.444 seconds; i.e. an improvement of 6.606 seconds.

A second curve 112 of FIG. 11 shows the cycle time of a so-called one-touch probing cycle in which the probe starts at the same distance away from the surface of the object as in the two-touch cycle and moves towards the object at the measurement feed rate until the trigger is acknowledged and acted on by the controller. The probe then decelerates to rest and is returned to the start position or a further start position for a subsequent measurement. The trigger or skip position is stored within the CNC controller and used to calculate the surface position. A one-touch cycle that uses an approach and measurement speed of 3000 mm/min was found to have a cycle time of 0.254 Seconds. An optimised two-touch routine with an approach speed of 3000 mm/min and measurement at 30 mm/min had a cycle time of 0.444 Seconds as outlined above. It can thus be seen that the duration of the one-touch routine is still slightly shorter than the optimised two-touch routine. Although one-touch measurement cycles are typically faster than two-touch cycles, it has been found that the accuracy of such one-touch measurement cycles can be significantly degraded for CNC controllers having longer scan times.

Referring to FIG. 12, the measurement uncertainty of a one-touch measurement is illustrated as a function of feed rate (i.e. probing speed). In particular, line 121 shows the uncertainty when the CNC controller scan time is 4 µs, line 120 shows the uncertainty when the CNC controller scan time is 1 ms, line 122 shows the uncertainty when the CNC controller scan time is 4 ms. A one-touch cycle that uses an approach and measurement speed of 3000 mm/min has a cycle time of 0.254 Seconds but, as shown in FIG. 12, there is an associated measurement uncertainty of around 0.2 mm for a CNC controller having a 4 ms scan time. This compares to an uncertainty of only 0.002 mm for an optimised two-touch measurement cycle implemented using the same CNC controller.

Referring to FIG. 13, it is shown how certain machine tools also have a "settling down" period 130 that arises because the transition from acceleration to a constant feed rate is typically not instantaneous. On a typical machine, it has been found that it can take up to 0.01 seconds for the axis to settle down and the speed in this transition phase from acceleration to constant feed rate is oscillating and uncertain. Taking measurements in this phase of the move can therefore increase the uncertainty of the measurements. The effect is particularly detrimental when using high feed rates, such as those use in a one-touch measurement process. For an axis travelling from a stationary start up to 5000 mm/min the distance over which this settling down occurs is 0.83 mm. If a stand-off distance of 2.5 mm is required to ensure measurements are taken outside of the acceleration zone, the addition of this settle down distance makes the optimum stand-off distance for such a one-touch cycle 3.33 mm. This should be contrasted with the optimised two-touch routine mentioned above in which the second touch or gauging move is implemented at a relatively slow feed rate of, say, mm/min. In such an example, the stand-off distance for the second touch need only be greater than 0.015 mm in order to ensure that the measurement takes place outside of the machine acceleration zone. The settling down distance is, in this case, only 0.005 mm and has a negligible effect on measurement speed if included in the calculation of the optimum stand-off distance.

In view of the foregoing, it can be seen that it is typically preferable to use the optimised two-touch strategy of the present invention for all but the fastest CNC controllers. The use of such a two-touch cycle has minimal negative impact on cycle times whilst ensuring the metrology is protected. The optimum two-touch measurement cycle may also avoid the need to purchase a high speed input option for the CNC controller. It should also be noted that although the above describes finding an optimum stand-off or back-off distance for a two-touch measurement cycle, the same technique is equally applicable to establishing the stand-off position for the measurement of a one-touch cycle or any other measurement cycle.

The above examples are described for a touch trigger probing system that comprises a measurement probe having a deflectable stylus implemented on a machine tool. The same principles are, however, applicable to any type of coordinate positioning apparatus and any type of probing system. For example, the techniques could be applied to coordinate measurement machines (CMMs). Similarly, any known type of measurement probe (e.g. contact or non-contact probes) could be carried by the coordinate positioning apparatus.

The invented claimed is:

1. A method for calculating an optimum stand-off distance for surface position measurements to be acquired by a coordinate positioning apparatus comprising a measurement probe and at least one moveable portion for moving the measurement probe relative to an object to be measured, the method comprising:
   measuring at least one acceleration characteristic of the coordinate positioning apparatus, the at least one measured acceleration characteristics comprising at least one of a measured acceleration and a measured deceleration of the at least one movable portion;
   calculating the optimum stand-off distance using the at least one measured acceleration characteristic of the coordinate positioning apparatus using a processor, the optimum stand-off distance being optimum distance off a surface of the object from which to initiate each surface position measurement;
   moving the measurement probe to the calculated optimum stand-off distance; and
   taking one or more surface position measurements of the object to be measured using the optimum stand-off distance; and
   wherein the step of measuring the at least one acceleration characteristic of the coordinate positioning apparatus comprises the steps of;
   measuring a first time interval corresponding to the time taken for a moveable portion of the coordinate positioning apparatus to move between two points of known separation at a commanded speed, wherein the move between the two points comprises acceleration of the moveable portion, and
   comparing said first time interval to a second time interval corresponding to the time that would be taken to move between the two points of known separation at a substantially constant speed equal to the commanded speed.

2. A method according to claim 1, wherein the step of calculating an optimum stand-off distance comprises calculating an optimum stand-off distance that ensures the measurement probe will be moving at a substantially constant speed during the subsequent acquisition of surface position measurements.

3. A method according to claim 1, wherein the step of calculating the optimum stand-off distance comprises taking account of any uncertainty in the estimated or nominal positions of the points for which surface position measurements are to be acquired.

4. A method according to claim 1, comprising the step of calculating an optimum stand-off distance for each of a plurality of measurement speeds.

5. A method according to claim 4, comprising the step of deriving a function or relationship from the optimum stand-off distances calculated at the plurality of measurement speeds that allows an optimum stand-off distance to be estimated over a range of measurement speeds.

6. A method according to claim 1, wherein the coordinate positioning apparatus comprises a numeric controller and the method comprises the step of assessing the uncertainty in the response time of the numeric controller.

7. A method according to claim 6, wherein the step of calculating the optimum stand-off distance comprises taking account of any uncertainty in the response time of the numeric controller.

8. A method according to claim 1, wherein the method is used with a coordinate positioning machine that comprises a numerically controlled machine tool having a spindle in which a measurement probe can be releasably retained.

9. A non-transitory computer-readable medium containing thereon a computer program that, when run on a computer, implements the method according to claim 1.

10. The method according to claim 1, wherein the measurement probe of the coordinate positioning apparatus comprises a touch trigger probe having a deflectable stylus.

11. A method for calculating an optimum stand-off distance or surface position measurements to be acquired by a coordinate positioning apparatus comprising a touch trigger probe having a deflectable stylus and at least one moveable portion for moving the touch trigger probe relative to an object to be measured, the method comprising:
   calculating the optimum stand-off distance using at least one measured acceleration characteristic of the coordinate positioning apparatus using a processor,
   the optimum stand-off distance being the optimum distance off of a surface of the object from which to initiate each surface position measurement, and
   the at least one measured acceleration characteristic comprising at least one of a measured acceleration and a measured deceleration of the at least one moveable portion;
   moving the measurement probe to the calculated optimum stand-off distance; and
   taking one or more surface position measurements of the object to be measured using the optimum standoff distance, and
   wherein a step of measuring the at least one acceleration characteristic of the coordinate positioning apparatus comprises the steps of;
   measuring a first time interval corresponding to the time taken for a moveable portion of the coordinate positioning apparatus to move between two points of known separation at a commanded speed, wherein the move between the two points comprises acceleration of the moveable portion, and
   comparing said first time interval to a second time interval corresponding to the time that would be taken to move between the two points of known separation at a substantially constant speed equal to the commanded speed.

12. A method according to claim 11, wherein the touch trigger probe has
   an overtravel limit and the method comprises the step of calculating the maximum measurement speed that can be used for surface position measurements without exceeding the overtravel limit.

13. A non-transitory computer-readable medium containing thereon a computer program that, when run on a computer, implements the method according to claim 11.

14. A method for calculating an optimum stand-off distance for surface position measurements to be acquired by a coordinate positioning apparatus comprising a measurement probe and at least one moveable portion for moving the measurement probe relative to an object to be measured, the method comprising;
- calculating the optimum stand-off distance using at least one measured acceleration characteristic of the coordinate positioning apparatus using a processor,
- the optimum stand-off distance being the optimum distance off of a surface of the object from which to initiate each surface position measurement, and
- the at least one measured acceleration characteristic comprising at least one of a measured acceleration and a measured deceleration of the at least one moveable portion,
- moving the measurement probe to the calculated optimum stand-off distance, and
- taking one or more surface position measurement of the object to be measured using the optimum stand-off distance, and
- wherein a step of measuring the at least one acceleration characteristic of the coordinate positioning apparatus comprises the steps of;
- measuring a first time interval corresponding to the time taken for a moveable portion of the coordinate positioning apparatus to move between two points of known separation at a commanded speed, wherein the move between the two points comprises acceleration of the moveable portion, and
- comparing said first time interval to a second time interval corresponding to the time that would be taken to move between the two points of known separation at a substantially constant speed equal to the commanded speed.

15. A method according to claim 14, wherein each surface position measurement is preceded by an initial measurement of substantially the same point on the surface of the object, wherein the surface position measurements are conducted at a first measurement speed and the initial measurements are conducted at a second measurement speed, the second measurement speed being higher than the first measurement speed.

16. A non-transitory computer-readable medium containing thereon a computer program that, when run on a computer, implements the method according to claim 14.

17. The method according to claim 14, wherein the measurement probe of the coordinate positioning apparatus comprises a touch trigger probe having a deflectable stylus.

18. A coordinate positioning apparatus comprising: a measurement probe for acquiring surface position measurements; at least one moveable portion for moving the measurement probe relative to an object to be measured; and
- a processor configured to perform the steps of:
- measuring at least one measured acceleration characteristic of the coordinate positioning apparatus, the at least one measured acceleration characteristic comprising at least one of a measured acceleration and a measured deceleration of the at least one movable portion;
- calculating an optimum stand-off distance using the at least one measured acceleration characteristics of the coordinate positioning apparatus for surface position measurements to be acquired by the coordinate position apparatus, the optimum stand-off distance off a surface of the object from which to initiate each surface position measurements,
- moving the measurement probe to the calculated optimum stand-off distance,
- taking one of more surface position measurements of the objects to be measured using the optimum stand-off distance, and
- wherein a step of measuring the at least one measured acceleration characteristic of the coordinate positioning apparatus comprises the steps of;
- measuring a first time interval corresponding to the time taken for a moveable portion of the coordinate positioning apparatus to move between two points of known separation at a commanded speed, wherein the move between the two points comprises acceleration of the moveable portion, and
- comparing said first time interval to a second time interval corresponding to the time that would be taken to move between the two points of known separation at a substantially constant speed equal to the commanded speed.

* * * * *